United States Patent
Chaubard

(10) Patent No.: US 12,412,147 B2
(45) Date of Patent: Sep. 9, 2025

(54) ON-SHELF IMAGE BASED BARCODE READER FOR INVENTORY MANAGEMENT SYSTEM

(71) Applicant: Focal Systems, Inc., Burlingame, CA (US)

(72) Inventor: Francois Chaubard, Millbrae, CA (US)

(73) Assignee: Focal Systems, Inc., San Francisco, CA (US)

( * ) Notice: Subject to any disclaimer, the term of this patent is extended or adjusted under 35 U.S.C. 154(b) by 209 days.

(21) Appl. No.: 17/685,000

(22) Filed: Mar. 2, 2022

(65) Prior Publication Data

US 2022/0284383 A1 Sep. 8, 2022

Related U.S. Application Data

(60) Provisional application No. 63/156,889, filed on Mar. 4, 2021.

(51) Int. Cl.
*G06Q 10/087* (2023.01)
*G06K 7/14* (2006.01)
(Continued)

(52) U.S. Cl.
CPC ......... *G06Q 10/087* (2013.01); *G06K 7/1413* (2013.01); *G06K 7/1417* (2013.01);
(Continued)

(58) Field of Classification Search
CPC .. G06Q 10/087; G06K 7/1413; G06K 7/1417; G06K 7/1443; G06K 7/1447;
(Continued)

(56) References Cited

U.S. PATENT DOCUMENTS

| 10,949,799 B2 | 3/2021 | Chaubard |
| 11,694,456 B2 * | 7/2023 | Ma .................. G06F 18/217 382/103 |

(Continued)

OTHER PUBLICATIONS

K. Higashiura et al., "Semi-Automated Framework for Digitalizing Multi-Product Warehouses with Large Scale Camera Arrays," 2024 IEEE International Conference on Pervasive Computing and Communications (PerCom), Biarritz, France, 2024, pp. 98-105, doi: 10.1109/PerCom59722.2024.10494498. (Year: 2024).*

(Continued)

*Primary Examiner* — Fahd A Obeid
*Assistant Examiner* — Jessica E Sullivan
(74) *Attorney, Agent, or Firm* — Fenwick & West LLP

(57) ABSTRACT

An inventory visibility management system utilizes fixed or motorized cameras to scan inventory bearing shelves in a backroom or warehouse of a store, as opposed to store shelves where merchandise is available for purchase, for inventory frequently to keep the system up to date on what boxes of inventory are on the shelf, what is in those boxes and where those boxes are on the shelf. The system may identify a bounding polygon around an identifier corresponding to the product and apply the bounding polygon to a machine-learned model, which may generate a high-resolution crop of the identifier as output. The system registers the identifier to the first bounding polygon and to a location associated with cameras that captured the plurality of low-resolution images. Upon receiving a request from a client device, the system may provide the location associated with the one or more cameras to the client device.

20 Claims, 9 Drawing Sheets

(51) Int. Cl.
*G06T 3/4076* (2024.01)
*G06V 10/25* (2022.01)
*G06V 10/82* (2022.01)
*G06V 20/52* (2022.01)
*G06V 30/14* (2022.01)

(52) U.S. Cl.
CPC ............ *G06T 3/4076* (2013.01); *G06V 10/25* (2022.01); *G06V 10/82* (2022.01); *G06V 20/52* (2022.01); *G06V 30/1448* (2022.01)

(58) Field of Classification Search
CPC ... G06T 3/4076; G06T 3/4046; G06T 3/4053; G06V 10/25; G06V 10/82; G06V 20/52; G06V 30/1448; G06V 10/225; G06V 10/267; G06V 10/273
See application file for complete search history.

(56) References Cited

U.S. PATENT DOCUMENTS

| | | | |
|---|---|---|---|
| 2011/0172822 A1* | 7/2011 | Ziegler | B25J 19/0091 348/E7.086 |
| 2014/0240467 A1* | 8/2014 | Petyushko | H04N 13/128 348/47 |
| 2015/0170405 A1* | 6/2015 | Hu | G06T 15/205 345/427 |
| 2015/0193909 A1 | 7/2015 | Maayan et al. | |
| 2015/0248591 A1* | 9/2015 | Shi | G06V 10/10 382/195 |
| 2017/0103515 A1 | 4/2017 | Hulth | |
| 2017/0262795 A1* | 9/2017 | Thapa | G06Q 10/087 |
| 2018/0005035 A1 | 1/2018 | Bogolea et al. | |
| 2019/0034864 A1* | 1/2019 | Skaff | G06Q 10/087 |
| 2019/0188879 A1* | 6/2019 | Shen | G06V 10/60 |
| 2019/0279017 A1* | 9/2019 | Graham | G07G 1/0063 |
| 2019/0347508 A1 | 11/2019 | Hari et al. | |
| 2020/0005225 A1 | 1/2020 | Chaubard | |
| 2020/0061839 A1 | 2/2020 | Deyle et al. | |
| 2020/0074394 A1* | 3/2020 | Fisher | G06T 7/70 |
| 2020/0202177 A1 | 6/2020 | Buibas et al. | |
| 2022/0366578 A1* | 11/2022 | Dolev | G06T 7/292 |

OTHER PUBLICATIONS

Detone, D. et al., "Deep Image Homography Estimation," arXiv:1606.03798v1, Jun. 13, 2016, pp. 1-6.

PCT Invitation to Pay Additional Fees, PCT Application No. PCT/US22/18508, Jun. 9, 2022, two pages.

PCT International Search Report and Written Opinion, PCT Application No. PCT/US22/18508, Aug. 3, 2022, 20 pages.

United States Office Action, U.S. Appl. No. 17/685,004, filed Dec. 27, 2023, 19 pages.

* cited by examiner

Receiving an electronic indication that a product designated for a given shelf space of a first space is low in stock, the indication including an identifier associated with the product
902

Determining a location of a replacement for the product in a second space different from the first space based on a first image of the identifier being captured in the second space
904

Causing a display, through a user interface, of the location of the box in the second space
906

Validating a placement of the replacement on the given shelf space
908

Capturing a second image of the location in the second space and determining from the second image that the replacement has been removed from the location
910

*FIG. 9*

ON-SHELF IMAGE BASED BARCODE READER FOR INVENTORY MANAGEMENT SYSTEM

CROSS REFERENCE TO RELATED APPLICATIONS

This application claims the benefit of U.S. Provisional Application No. 63/156,889, filed Mar. 4, 2021, the disclosure of which is hereby incorporated by reference herein in its entirety.

TECHNICAL FIELD

The disclosure generally relates to the field of image processing, and more particularly relates to generating high resolution images based on multiple lower resolution images.

BACKGROUND

Retail stores, inventory rooms, and warehouses need to manage millions of products in boxes coming in and out of the facility each day and night. As truckloads of stock make its way off the truck, to the inventory storage location, inventory management systems need to direct the stock in a location so that it can be logged, tracked, and found again quickly and easily when it is needed. However, with millions of products entering and exiting these facilities, simple scan in and scan out methods are not efficient, practical, or accurate. For example, Employees or customers may move, remove or add product without updating the system or without updating it properly. Breaking and spoilage can result in loss that is not tracked. During periods of high traffic (e.g., holiday shopping), the shelf fixture might be so flexed that the facility may not have enough shelf space for all of the inventory required, so it is placed on the floor nearby, causing it to be scanned as an incorrect product or not scanned at all. The above situations and others and more may result in the Inventory Management System not knowing how much of a particular product is currently in the facility, and where the inventory that is in the facility is. In order to receive keep track of up-to-date and accurate stock information, an employee of the facility needs to walk the facility to scan in each box in the facility, which can take hours and is also error prone. While management can reduce this activity, this comes at the cost of lower inventory visibility which leads to higher inventory cost and more labor to find stock that is needed. Moreover, an inability to locate stock may cause delays in re-shelving inventory that is out-of-stock on store shelves.

SUMMARY

Systems and methods are disclosed herein for operating an inventory management system that utilizes cameras to scan inventory bearing shelves in a backroom or warehouse of a store (as opposed to store shelves where merchandise is available for purchase by customers) for inventory frequently to keep the Inventory Management System (IMS) up to date on what boxes of inventory are on the shelf, what is in those boxes (looked up by some visualized, detected, and read unique identifier like a barcode, QR code, or Stock Keeping Unit (SKU)), and where those boxes are on the shelf. Small cameras are placed throughout the facility, typically on opposing shelf fixtures, that conduct "scans" at some daily frequency, typically hourly. The number, placement, resolution, motorized movement, and Field of View (FOV) of those cameras deployed are all customized to ensure accurate scanning, low total cost, and coverage of the unique identifier per box for all the inventory that requires covering. During each "scan", each camera may take a sequence of images that will be processed either locally on the camera, in a local server, in the cloud, or some combination thereof, and may move powered by some motor to increase coverage per camera and reduce overall cost.

The inventory visibility management system may receive a plurality of low-resolution images taken by the small cameras. Each low-resolution image may include at least a portion of a product. The inventory visibility management system may pre-process the low-resolution images resulting in pre-processed images ready for further analysis. In each pre-processed image, the inventory visibility management system may identify a first bounding polygon around the product, and a second bounding polygon around an identifier corresponding to the product. The inventory visibility management system may apply at least the second bounding polygon to a machine-learned model, which may generate a high-resolution crop of the identifier as output. The inventory visibility management system may register the identifier to the first bounding polygon and to a location associated with one or more cameras that captured the plurality of low-resolution images. Responsive to receiving a request from a client device, the inventory visibility management system may provide the location associated with the one or more cameras to the client device. In one embodiment, given the huge size of warehouses and backrooms, it may not be scalable to use high-resolution cameras, because it may be expensive to use high-resolutions cameras. In addition, transmission of high-resolution images to a cloud server may take up bandwidth and may result in huge data storage space. Using low-resolution images taken by small cameras, therefore, may be more computational efficient, space efficient, and cost-efficient.

The inventory visibility management system as described herein provides up-to-date information on what and how much inventory is in the store and where that inventory is. This enables seamless downstream activity, such as, for example, ordering more product only as needed based on accurate inventory knowledge, and quicker restock of inventory as the inventory that is in the facility can be found more quickly, and will save the facility time by not having to walk around daily or weekly to scan in each box in the building.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 9 illustrates an exemplary process for managing inventories using a user interface, in accordance with one embodiment.

DETAILED DESCRIPTION

Example System Environment and Architecture

Figure 1:
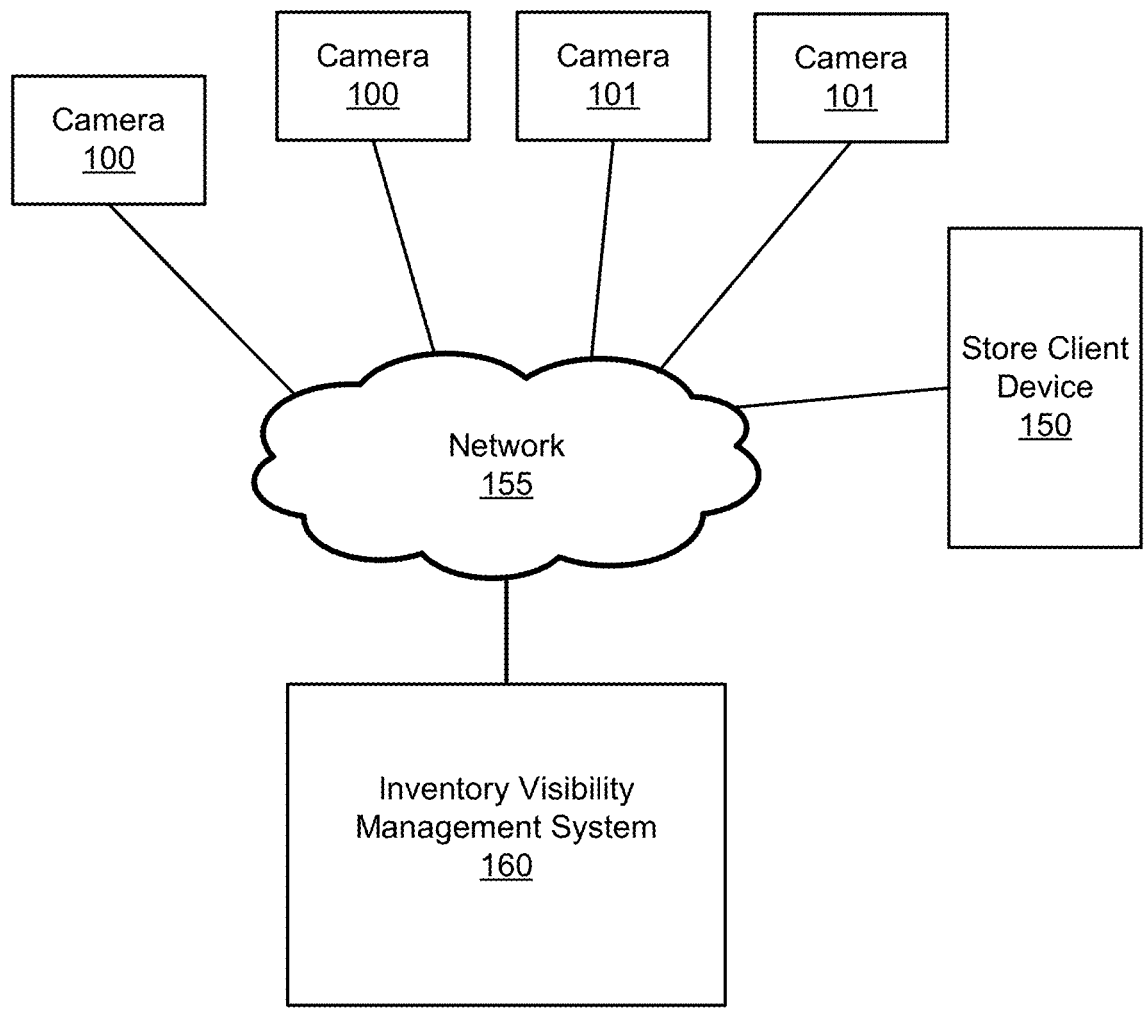
FIG. 1 illustrates one embodiment of a system environment including an inventory visibility management system that manages inventories, in accordance with one embodiment.

FIG. 1 illustrates a system environment for an inventory visibility management system, in accordance with various embodiments. FIG. 1 includes one or more sales shelf cameras 100, one or more backroom cameras 101, a store client device 150, a network 155, and an inventory visibility management system 160. Alternate embodiments may include more, fewer, or different components and the functionality of the illustrated components may be divided between the components differently from how it is described below.

An inventory visibility management system 160 maintains and manages information associated with inventory. Stores, such as grocery stores, include a number of aisles created by rows of shelves on which products are stocked and the location of the products within the store is organized, albeit often loosely, in a predetermined layout known as a planogram. Each camera 100 is associated with a unique camera ID and mounted on a shelf with a predetermined set of products within the camera's field of view known to the inventory visibility management system 160 based on the planogram of the store. Each camera 100, therefore, collects image data for a predetermined set of products on opposing shelves for on-shelf inventory tracking and out of stock detection. In one embodiment, the camera 100 is equipped with a motor to cause the camera 100 to pan, for example, from the top left of the opposing shelf to the top right, angle downward, and then pan from left to right again in an iterative manner until it hits the bottom right. Moreover, each camera 100 may, along with one or more images of the opposing shelf unit, send information about the camera 100 to the inventory visibility management system. Each camera 100 may be equipped with a cellular connectivity modem for communicating directly with a cell tower, for example. In another embodiment, each camera 100 may be equipped with a Wi-Fi chip and connected straight to a pre-existing network. In some embodiments, the camera 101 collect images in backrooms or warehouses, where inventory is stored for future sale or distribution. In some embodiments, a store can also be a warehouse (e.g., Costco). Each camera 100 or 101 may a high-resolution camera or a low-resolution camera. A high-resolution camera may have a higher resolution, (e.g., more pixels in a unit area of image) than the low-resolution camera. In one embodiment, a human may predetermine a threshold that distinguishes low-resolution cameras from high-resolution cameras. In some embodiments, a high-resolution camera may be a camera that is capable of providing one single image sufficient for identifier decoding, while a low-resolution camera may need to provide several images for decoding a barcode.

The store client device 150 (e.g., a desktop computer, mobile device, tablet computer, etc.) receives information about the status of the store from the inventory visibility management system 160 and presents the information to a store associate (e.g., a store owner, manager, or employee). For example, the store client device 150 may present a store associate with information about which items are low in stock or out of stock (e.g., lower than a threshold of stock, such as the quantity being lower than 1.) The store client device 150 may also present a map that indicates where, in the store, products are located. In some embodiments, the store client device 150 presents images within which the inventory visibility management system 160 has identified as requests by users. These images may include bounding boxes that identify where in the image an item is located.

The cameras 100 and the store client device 150 can communicate with the inventory visibility management system 160 via the network 155, which may comprise any combination of local area and wide area networks employing wired or wireless communication links. In one embodiment, the network 155 uses standard communications technologies and protocols. For example, the network 155 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 155 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 155 may be represented using any format, such as hypertext markup language (HTML) or extensible markup language (XML). In some embodiments, all or some of the communication links of the network 155 may be encrypted. Moreover, the images can be communicated via Bluetooth or radio. For example, each individual camera may be equipped with a cellular connectivity modem that communicates directly with a cell tower. If the modem can transfer data then the camera can send the image and information directly to the cloud for processing by the inventory visibility management system 160. The camera may also send a SMS based alert with the current state of a shelf unit.

The inventory visibility management system 160 utilizes cameras 100 and 101 to scan inventory bearing shelves in a backroom or warehouse of a store (as opposed to store shelves where merchandise is available for purchase by customers) for inventory frequently to keep the Inventory Management System (IMS) up to date on what boxes of inventory are on the shelf, what is in those boxes (looked up by some visualized, detected, and read unique identifier like a barcode, QR code, or Stock Keeping Unit (SKU)), and where those boxes are on the shelf. The inventory visibility management system 160 may be located within the store or remotely. In one embodiment, an out-of-stock detection system may notify store management that a product is out of stock. The out-of-stock detection system may allow a store's management to have up-o-date information on which items are out of stock within the store, so items can be restocked more quickly. It also removes the need for a store employee to travel through the store to determine which items are out of stock, thereby reducing the number of employee-hours that the store spends on restocking items. Furthermore, the out-of-stock detection system can collect and analyze data on the rate at which items need to be restocked and can present the analyzed data to the store management for more information on how often items need to be restocked. The out-of-stock detection system is discussed in detail in the U.S. patent application Ser. No. 16/024,519, entitled "On-shelf Image Based Out-of-Stock Detection," filed on Jun. 29, 2018, the disclosure of which is hereby incorporated by reference herein in its entirety.

In an embodiment, the sequence of images from each camera is comprised of a sweep through E exposures, C contrasts, B brightness's, P positions (translation), and A angles (rotation), producing E*C*B*P*A images per sequence of images per camera. The inventory visibility management system 160 may merge the sequence of images from all cameras via an algorithm to create super resolution versions of these sequences of images to provide a set of much higher resolution images of the scene. These "merged images" are much higher resolution than any single image could achieve from the same camera. Then, the inventory visibility management system 160 may run a set of processing algorithms on the sequence of images and on the merged images, collectively the "input", to first detect bounding boxes around each box in the input with its corresponding (x,y) image coordinates and width, height, and rotation and also (X,Y,Z) global coordinates in the real world. Then the inventory visibility management system 160 may detect a unique identifier inside each box (such as a QR code, barcode, or text) if a unique identifier exists on the box at specific (x,y) image coordinates. Where a unique identifier does not exist for a box, is not viewable from the FOV of the cameras, or is damaged in any way preventing the algorithm from parsing the unique identifier, the inventory visibility management system 160 may responsively detect that there is a box with no discernable identifier, and record that bounding box with (x,y) image and (X,Y,Z) global coordinates and send an alert for some action to be taken by a person to fix the issue. If an image or sequence of images from a camera is temporarily occluded by an object, the inventory visibility management system 160 may identify that and may ignore those images and request that the camera take another sequence of images. If an image or sequence of images from a camera is permanently occluded by an object or the camera is not functioning properly in any way, the inventory visibility management system 160 may identify that and alert a person to take an action to rectify the issue.

Figure 2:
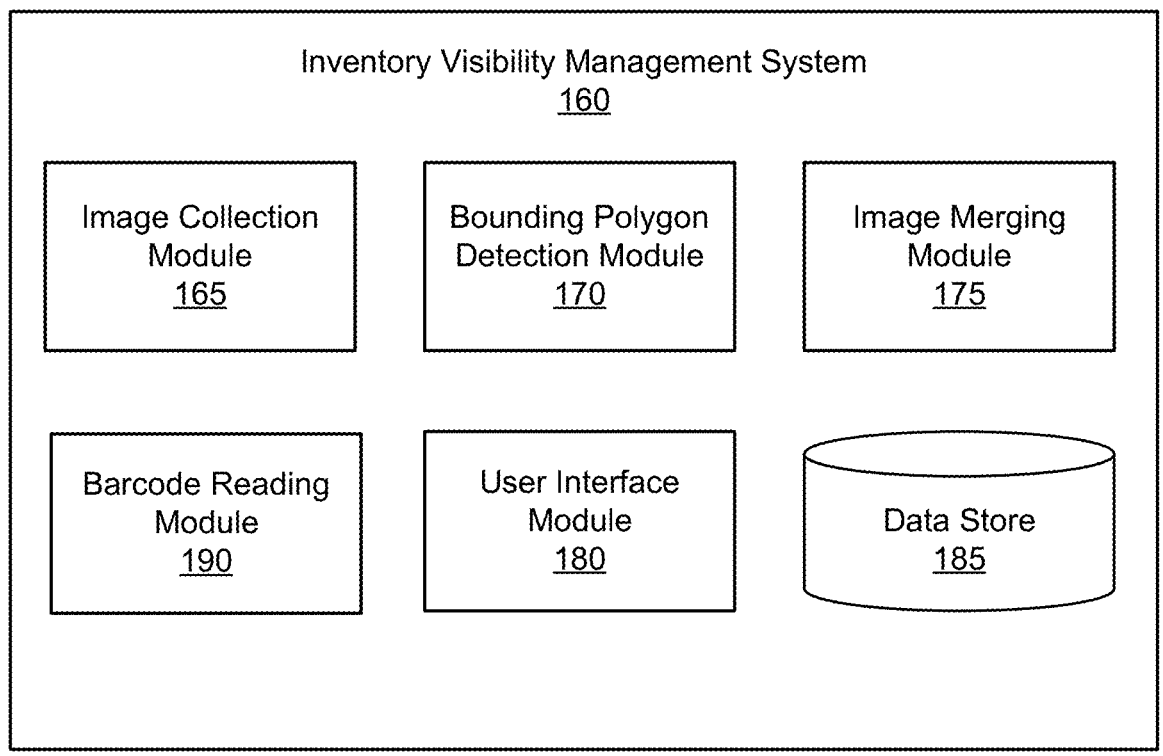
FIG. 2 illustrates one embodiment of exemplary modules included in the inventory visibility system, in accordance with one embodiment.

The inventory visibility management system 160, as illustrated in FIG. 2, includes an image collection module 165, a bounding polygon detection module 170, an image merging module 175, a barcode reading module 190, a user interface module 180, and a data store 185. Alternate embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data store 185 stores data used by the inventory visibility management system 160. For example, the data store 185 can store images from the camera 100 and the store client device 150. The data store 185 can also store location information associated with template images, and can store products identified in images by the product detection module 150. The data store 185 can also store product information, a store map or planogram, shopper information, or shopper location information. In some embodiments, the data store 185 also stores product-detection models or other machine-learned models generated by the inventory visibility management system 160. In one embodiment, at least some of the computation occurs locally on the camera system itself that includes a relatively small deep learning neural network. Then a larger amount of the computation (big deep learning models) would happen on a server that is deployed inside the store. Accordingly, in one embodiment, an additional portion of the computation could happen in the cloud via a back end of the inventory visibility management system 160.

The image collection module 165 collects images from the cameras 100 and, in some embodiments, from the store client device 150. The image collection module 165 stores collected images and image labeling data in the data store 185. In one embodiment, n cameras 1-n are arranged facing inventory in a setting where inventory is stored but not customer facing (e.g., a warehouse, a back room of a store, and so on)—this setting is referred to throughout as a "facility" for convenience. Cameras 1-n may be low resolution cameras that, on their own, produce images from which scannable codes (e.g., QR codes, barcodes, etc.) are not discernible. Alternatively, cameras 1-n may include a mixture of low and high-resolution cameras. Cameras 1-n may be located at fixed positions but be able to rotate at a joint to capture a wide range of angles. Alternatively, or additionally, cameras 1-n may be located on a track and may be motorized to move in the direction of the track (e.g., laterally, up and down, etc.). Advantageously, moveable cameras reduce the number of cameras needed to capture a desired amount of inventory within the images. The image collection module 165 captures a sequence of images (e.g., periodically, at various time intervals, or when triggered (e.g., based on a motion sensor detecting motion)) and passes the images to the image merging module for further processing.

The image collection module 165 may pre-process collected images and generate pre-processed images. In one embodiment, the image collection module 165, through a device (e.g., a server, operating on-premises of the store or in the cloud), collects the captured images and pre-processes the images against one or more protocols to discard bad images. Bad images are images that are not suitable for use in generating one or more super-resolution images from the collected images. For example, images may be blurry (e.g., due to camera vibration or movement), and blurry images will be discarded. The image collection module 165 may remove pixels from images where some or all of a person is present. The image collection module 165 may detecting these "people pixels" by performing pattern recognition, or by inputting captured images into a machine learning model and receiving indication of pixels corresponding to people as output from the model. The image collection module 165 may train a model using training images that have pixels labeled where a person is present in the image. People removal becomes important because a facility is prone to having people frequently present (e.g., to remove inventory from the facility for re-stocking shelves within a customer-facing portion of a store). The term "people" is meant to be non-limiting and may apply to robots serving this function as well, where a model may be trained to detect robot pixels in images and remove them. In an embodiment, the device may discard images where people or robots are detected, rather than removing the impacted pixels.

Similar to people removal, the image collection module 165 may remove occlusions from images and/or discard images where products are occluded. The term occlusions, as used with respect to FIG. 2 refers to a scenario where an object or person occludes inventory and thus prevents the camera from capturing an image of that inventory. Occlusion may be detected and removed in the same manner that people pixels are described to be removed above. Images pre-processed by the image collection module 165 are passed to the image merging module 175 for image merging.

The bounding polygon detection module 170 identifies a bounding polygon around each box (that is boxes that hold product) as well as a bounding polygon around each box identifier (that is a scannable code visible on each box, if any). The bounding polygon detection module 170 is discussed in further detail in accordance with FIG. 3.

Figure 3:
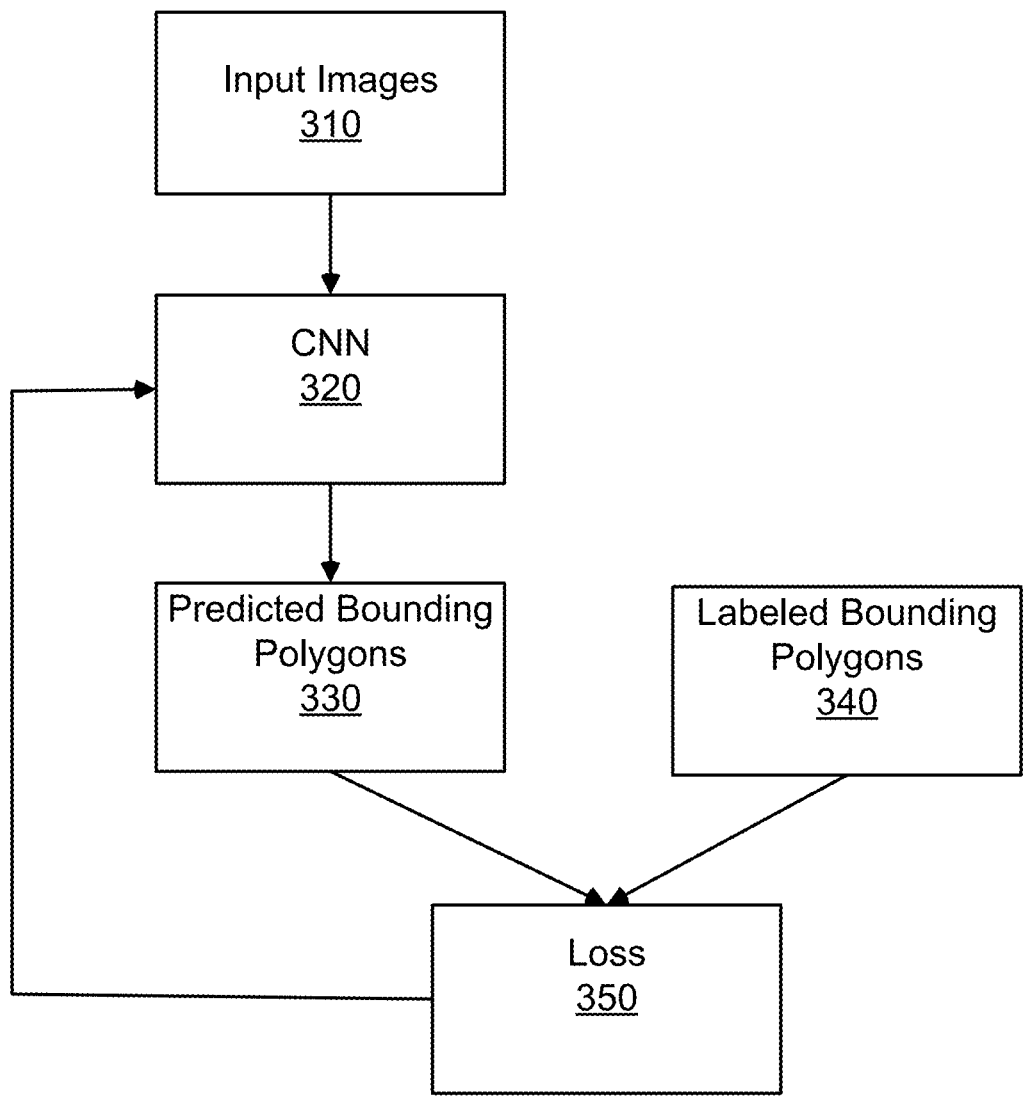
FIG. 3 illustrates one embodiment for predicting bounding polygons based on input images, in accordance with one embodiment.

FIG. 3 illustrates an exemplary training process for detecting bounding polygons. The bounding polygon detection module 170 may train a bounding polygon CNN 320 (convolutional neural network). The bounding polygon detection module 170 may first collect input images 310 from a similar environment as would be used in production (e.g., captured at same time or not, having similar field of view (FOV) or not, having the same resolution, exposure, and brightness, or not). Images 310 may be applied to a fully trained bounding polygon CNN 320, where the CNN 320 outputs the predicted bounding polygons 330 around the boxes, scanning codes, obstructions, and any other features that are deemed useful for the business purpose. The CNN 320 is one example of a machine learning model used to make the predictions, while any other machine learning models or algorithms suitable for predicting the bounding polygons may be used. Each image may be labeled by drawing a labeling bounding polygon 340 around each box, around each box identifier, each person, etc. The labels to train the CNN can come from a human drawing bounding polygons over the boxes, scanning codes, obstructions, etc. Or they can come from a computer automatically inferring this. There are many ways this can occur. For example, the Sobel filter can be used to target the scanning code bounding polygons automatically those labels can teach the CNN about those areas. As another example, if two images were taken with an overlapping FOV then, the bounding polygon detection module 170 may only label one of those images and by calculating a homography. The bounding polygon detection module 170 may transfer bounding polygon labels from the labeled image to the unlabeled image and get the labels on the second image with a simple application of the homography. In one embodiment, the bounding box detection module 170 may artificially add scan codes to the image via computer code to know the label for where the CNN should detect a bounding polygon as the computer code inserted the scan code into the picture.

The bounding polygon detection module 170 may train the bounding polygon CNN 320 on all of the bounding polygons labeled by a computer or by a human iteratively using Stochastic Gradient Descent, selecting a subset of the images, forward passing the CNN, then taking the output of the CNN and comparing that output label to the human or computer generated labels, and calculating an error (i.e., loss) 350 between the two labels and back-propagating that loss 350 to change the weights inside the CNN to improve the result next time. This is done until SGD converges or until the test accuracy (measured by forward passing the CNN on a holdout set of labels and images) has peaked.

In one embodiment, the bounding polygon detection module 170 may cluster overlapping bounding polygons that are referring to a same box (e.g., identifying across different images which bounding polygons correspond to a same product and/or identifier) and other clusters that are referring to the same box identifier using an IOU (intersection over union) threshold and in some embodiments utilizing Non-Max Suppression (NMS) where we go through all bounding polygons per class type (boxes, scanning codes, etc.) and put them all in a first polygon list, select the bounding polygon with the highest probability, remove it from the first polygon list add it to the second polygon list, where the second polygon list is empty to begin with. Then the bounding polygon detection module 170 may compare all bounding polygons in the second polygon list, again calculate the IOU (Intersection over Union) of this polygon with every other polygon in the second polygon list. If the IOU is greater than some threshold, the bounding box detection module 170 may remove it from the second polygon list as it is already represented. The bounding polygon detection module 170 may then go back to the first polygon list and select the next highest probability polygon. The bounding polygon detection module 170 may repeat this process until there are no more proposals left in first polygon list.

Continuing with the discussion of FIG. 2, the image merging module 175 may merge low-resolution images and generate a high-resolution image. The image merging module 175 may apply a merge algorithm to merge bounding polygon crops of a product identifier into a high-resolution crop around a box identifier. The merge algorithm applies the bounding polygon crops from the clusters for the box identifiers to a machine learning model (e.g., a CNN). The merge algorithm and training process for training the CNN to output a "super-resolution" image is described in further detail with respect to FIG. 4, shown below.

Figure 4:
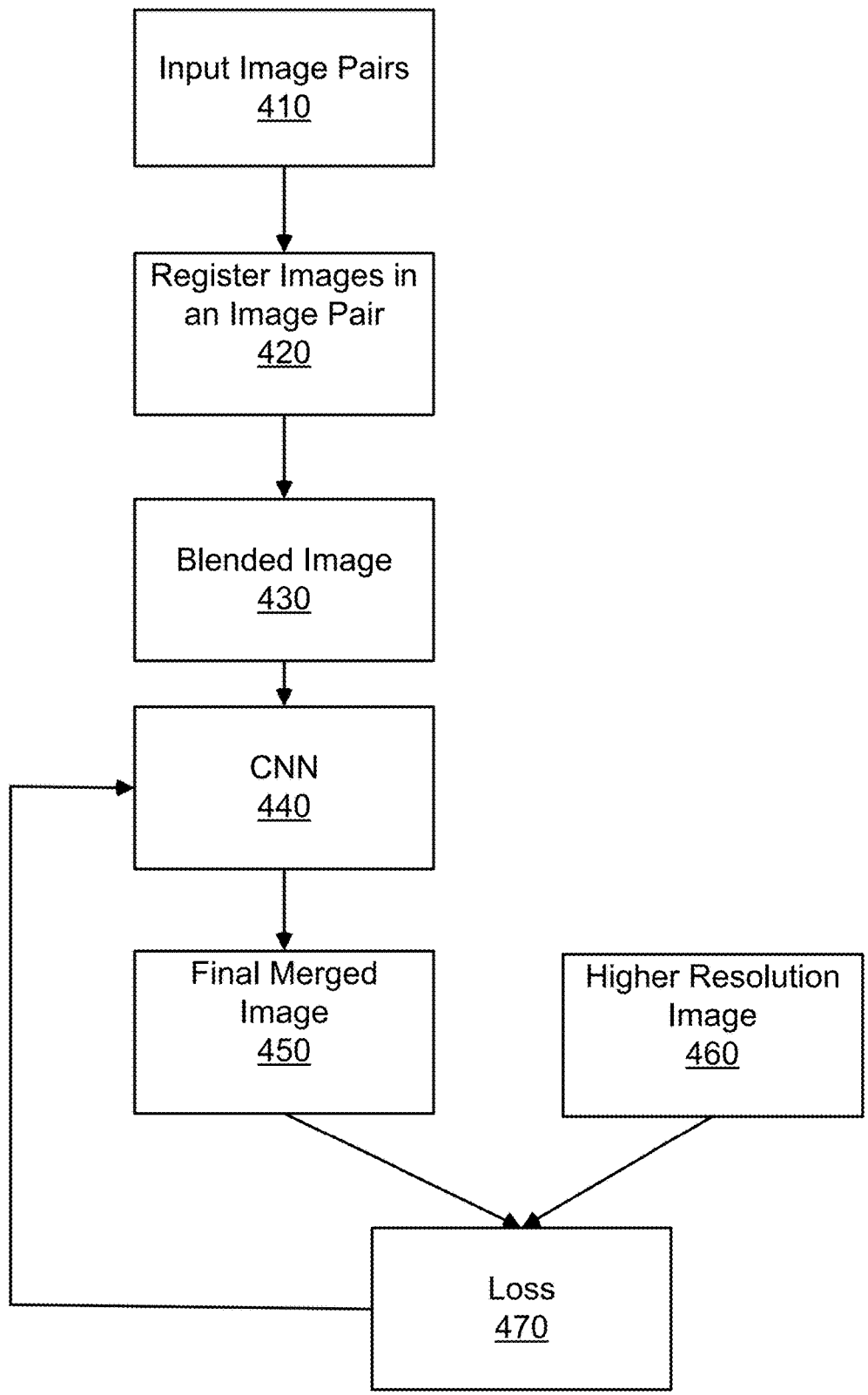
FIG. 4 illustrates one embodiment for merging lower resolution images into a higher resolution image, in accordance with one embodiment.

FIG. 4 illustrates an exemplary process for merging multiple low-resolution images. The image merging module 175 may detect a homography and applies the homography to the collection of image pairs 410, where an image pair may include images captured from different cameras at a same time, or within a threshold amount of time from one another. The collection of image pairs 410 may be images or portions thereof determined to feature a same product. The detected homography registers 420 the collection of images to the same coordinate system by first extracting "key points" from both images, second matching those key points from image one and image two using some matching function to isolate high quality pairs, then randomly selects a subset of pairs (perhaps using RANSAC or random sample consensus) and use that random subset to compute a linear mapping y=Hx where y is the point from the pair in the first image in homogeneous coordinates y=(x,y,1) and x is that same matched point in the pair in the second image x=(x, y,1), then using linear regression's normal equation, the image merging module 175 may calculate H for that randomly selected subset of pairs, then test the quality of that H by measuring the how many of the other pairs not selected that were not used in the computing of H to find the inlier to outlier ratio. The image merging module 175 may do this many times for many different subsets of the pairs and pick the H that has the highest inlier to outlier ratio. The extracted key points could be extracted using SIFT, SURF, ORB, BRIEF, or a Deep Learning Method. A Key Point is a 3-tuple of (x coordinate, y coordinate, and v which is a feature vector describing the region around this key point). The feature vector could be from SIFT, ORB, BRIEF, SURF, a deep learning model, or otherwise. The matching function can be any function taking in two key point 3-tuples and outputting a scalar value that is low when the key points are similar looking and high when they are not similar. Or if preferred high when the key points are similar looking and low when they are not similar. Some exemplary matching functions could be cosine similarity, mahalanobis distance, L2 Distance, L1 Distance, Earth Mover Distance, Mutual Information, etc.

The image merging module 175 may register every image respective to each other using the homography method previously described. The image merging module 175 may first take a pair of images with overlapping FOV. The image merging module 175 may extract features from both images and calculate pairs of features each pair being a feature from image 1 that is close in distance to a feature in image 2, then the image merging module 175 may run RANSAC (random sample consensus) which randomly selects a subset of the pairs, calculates a homography as before using linear algebra, and determines the quality of the homography as the inlier—outlier ratio as before. This process is repeated until a threshold inlier—outlier ratio is met. Then the second image is "registered" or "stitched" to the first image by applying the best calculated homography to move, translate, rotate, and scale the second image by the homography on top of the first image so that visually similar patches are overlapping each other in the same coordinate space. In this way, if a cheerios box was located at x=50 pixels and y=80 pixels in the first image, then now in the second Image, the cheerios box is also located at x=50 pixels and y=80 pixels where it may not have before. Then this "registered" second image is saved off and used together with a third image with overlapping FOV to the second image and are taken through the same process to produce a registered third image. This process is repeated for every image.

Once all images taken are registered, the image merging module 175 may then combine overlapping image patches between images to create a higher resolution patch.

In a first embodiment, the image merging module 175 merge, blend or cut two images that have been registered one to the other with an overlapping patch of pixels, by performing a blending 430 or cutting technique such as Laplacian Blending to combine the two image patches to output a higher resolution version of the image patch. Laplacian Blending works by taking the first image patch and reducing its resolution using subsampling a number of times to perform a "left image pyramid" L and doing the same for the second image patch creating a "right image pyramid" R and create a Gaussian Pyramid G that is a weighting from left 0 following a Gaussian to right 1 and then use G to combine each level in the pyramid of L and R to produce a final combined pyramid F by F_layer_i=L_layer_i*G_layer_i+ R_layer_i*(1−G_layer_i).

In a second embodiment, the image merging module 175 may use a trained CNN such as a Stacked Hourglass CNN 440 or U-Net and take in as input all registered images with overlapping FOV and output a final merged image which may be an unsampled, higher resolution version of all the images. The CNN 440 is one example of a machine learning model used to merge the images, while any other machine learning models or algorithms suitable for merging the images may be used. This can be easily trained by collecting many pairs of images taken at the same time, many from cameras with low resolution all with partial FOV ("input images"), and one with high resolution with a complete FOV (the "target image"), and train the CNN to take in as input all the low resolution images and output the final merged image 450, and then compute loss 470 between the Merged Image and the "target" high resolution image 460 using Cross Entropy loss, Mean-Squared Error, or other loss functions. The image merging module 175 may train over many pairs using SGD until test loss has hit a low.

In a third embodiment, the image merging module 175 may use the output from the first embodiment as an input into the second embodiment to increase the accuracy of the super-resolution algorithm.

Continuing with the discussion of FIG. 2, the barcode reading module 190 may apply decoding algorithm for decoding the box identifier. A barcode is used as an example of the identifier in the discussion below, while any identifier such as a QR code (quick response code) or just using OCR (optical character recognition) to identify a product may also be decoded by the barcode reading module 190. An exemplary decoding process is shown below in FIG. 5. Following generation of a super-resolution image, a box identifier or scan code that was previously not legible from a low-resolution image now becomes legible. This enables the device to decode the box identifier by applying a barcode reading algorithm 520 on the high-resolution crop, yet no high-resolution image was deployed. The term "barcode reading algorithm" is non-limiting and may apply to any scannable code. The barcode reading algorithm 520, after being trained, takes a super-resolution image (or a bounding polygon crop of a scannable code alone) as input and outputs an identification of a product or a decoding of the scan code image patch.

In one embodiment a traditional, hard coded, decoding algorithm 520 can be applied to take in a bounding polygon of a scan code and output the decoded message from the scan code. This could include zbar, zxing, or any of the other free open-source algorithms.

In another embodiment, the barcode reading module 190 may train a deep learning model (DLM) to take as input the image patch located inside the bounding polygon surrounding the scan code in the merged image and output the decoded value. The DLM or Recurrent Neural Network (RNN) feeds the image into both a Transformer Layer and a Bidirectional Long Short Term Memory (BiLSTM) Layer. Then the outputs from both Layers are concatenated and passed through a Fully Connected Layer or Dense Layer. Then the barcode reading module 190 may feed the output back in as input again to the same layers. This is repeated until the output emits a "stop" value, perhaps a value in one of the channels to be >0.5. At each stage in the recurrence, the output values are saved. Then the barcode reading module 190 may smooth the outputs using a language model or a Conditional Random Field. Then the barcode reading module 190 may decode the output value to produce a set of ASCII characters 530 in the form a string. During training, the barcode reading module 190 may compare the decoded output values to the target or true output values (e.g., labels) 540 and a loss 550 is calculated using MSE, Jaccard Similarity, Cross Entropy, BLEU score, or otherwise and the loss 550 is propagated back through the model via SGD to update the weights to perform at a lower loss 550 next time. The training data for this task can be real data collected in the wild and labeled as per previous tasks explained in this document or synthetically generated from a computer program where the computer program creates a random ASCII string, creates an image of a QR code or barcode where the decoded value is that string, augments or corrupts the image, and then passes it to the DLM as input and then uses that string as the target output to train against, and this is performed repeatedly until the DLM achieves desirable loss or accuracy.

Figure 5:
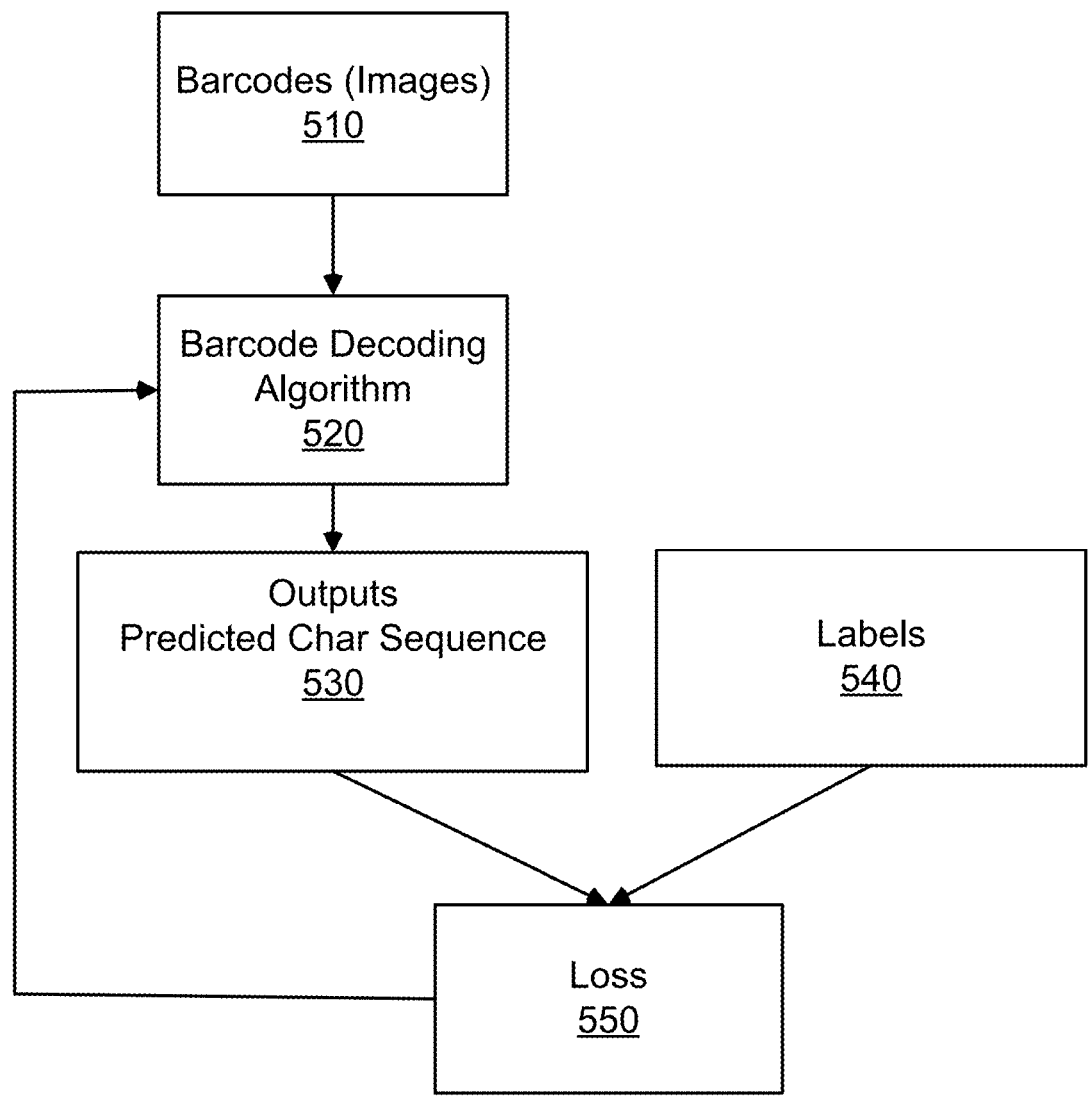
FIG. 5 illustrates one embodiment decoding an identifier such as a barcode, in accordance with various embodiments.

Following the process of FIG. 5, the device pairs box polygons to the now readable identifier polygons (e.g., pairs product identity, as derived using the process of FIG. 4, to a product itself) by IOU threshold. For example, where a box polygon and an identifier polygon overlap or are sufficiently near, the device determines that the product represented by the box polygon is a product that has an identifier corresponding to what was decoded.

In one embodiment, the inventory visibility management system 160 may determine box polygons that do not have a paired box identifiers paired to it. For example, where a product cannot be identified, the inability to identify the product may be flagged to a human being, such as a store supervisor, who may manually identify the product. The inventory visibility management system 160 may also report each box polygon with its successfully decoded box identifier with a timestamp and a location identifier. The location identifier, along with the box identifier, enable a product to be quickly and easily found within a warehouse.

The inventory visibility management system 160 described with respect to FIG. 1 is described with respect to a store environment; however, the systems and methods disclosed herein may apply to any warehouse environment (e.g., shipping warehouses, hospitals with stock of medical equipment, supply closets, military bases where artillery is stored, and so on). FIG. 5, shown below, generalizes the process of FIG. 1 to apply to these other environments. Wherever disclosure is made with respect to a store, a customer, or a purchasable product, this is merely exemplary, and any other scenario may apply.

The user interface module 180 interfaces with the store client device 150. The interface generation module 170 may receive and route messages between the inventory visibility management system 160, the cameras 100, and the store client device 150, for example, instant messages, queued messages (e.g., email), text messages, or short message service (SMS) messages. The user interface module 180 may provide application programming interface (API) functionality to send data directly to native client device operating systems, such as IOS®, ANDROID™, WEBOS®, or RIM®.

The user interface module 180 generates user interfaces, such as web pages, for the out-of-stock system 130. The user interfaces are displayed to the store associate through the store client device 150. The user interface module 180 configures a user interface based on the device used to present it. For example, a user interface for a smartphone with a touchscreen may be configured differently from a user interface for a web browser on a computer.

The user interface module 180 can provide a user interface to the store client device 150 for capturing template images of store shelves that hold products for sale by the store. Additionally, the user interface module 180 may provide a user interface to the store client device 150 for labeling products in template images. The user interface module 180 receives images from the camera 100 and the store client device 150 and stores the images in the data store 185.

Figure 6:
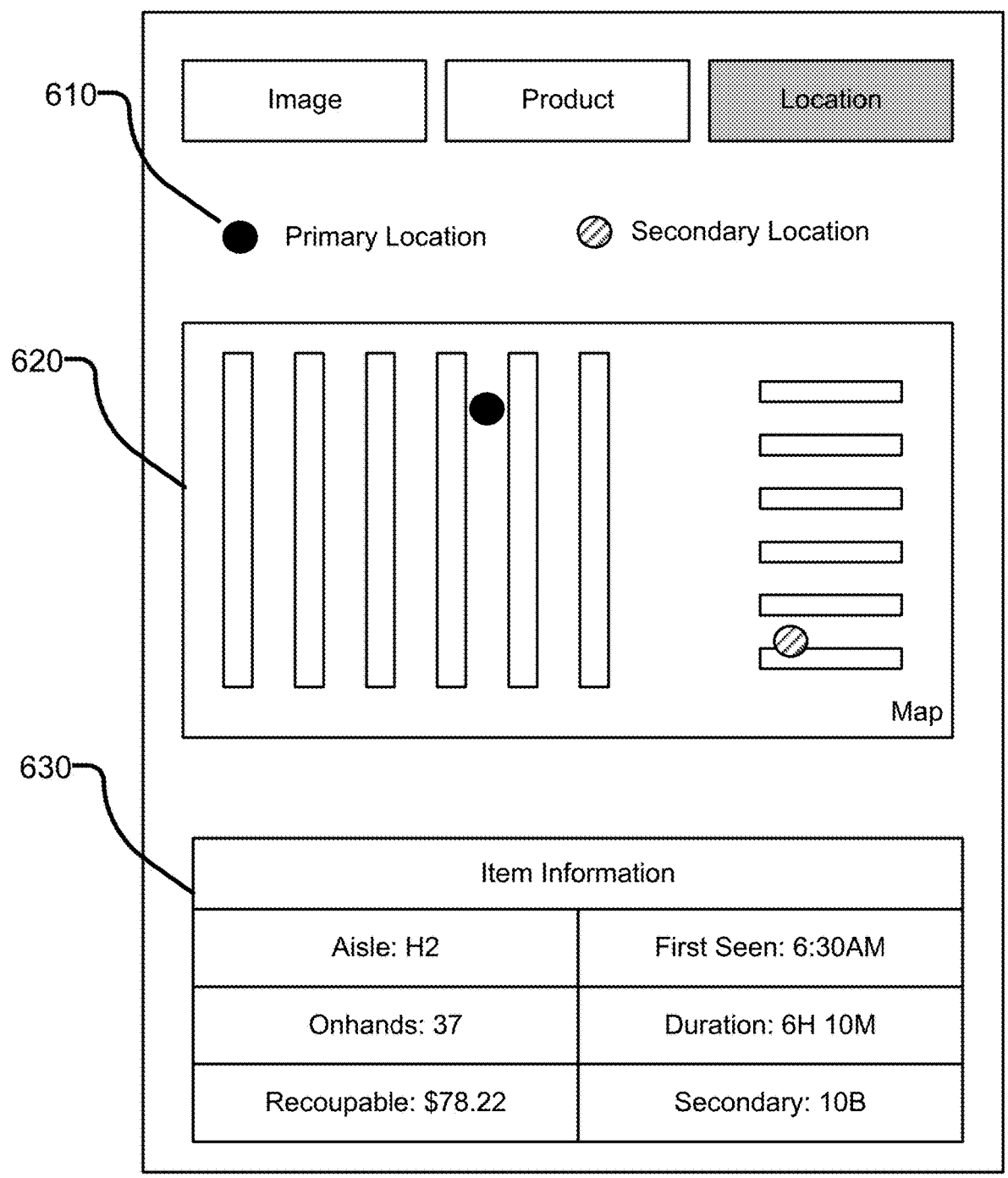
FIG. 6 illustrates one exemplary user interface for viewing inventory visibility, in accordance with various embodiments.

FIG. 6 illustrates an exemplary user interface for managing inventory visibility. The user interface illustrated in FIG. 6 may include one or more indications 610 for primary and/or secondary locations for the product. The user interface may further include a map 620 of the warehouse, with the indications 610 illustrated in the map pinning the locations. The user interface may also include additional information 630 associated with the product that is stored in the datastore 185. For example, the additional information 630 illustrated in FIG. 6 may include an aisle number, the number of products on hand, a price for restocking the product, a secondary location of the product, a timestamp indicating when the product was last seen or first seen in the warehouse, and a duration how long the product has been sitting in the backroom.

Figure 7:
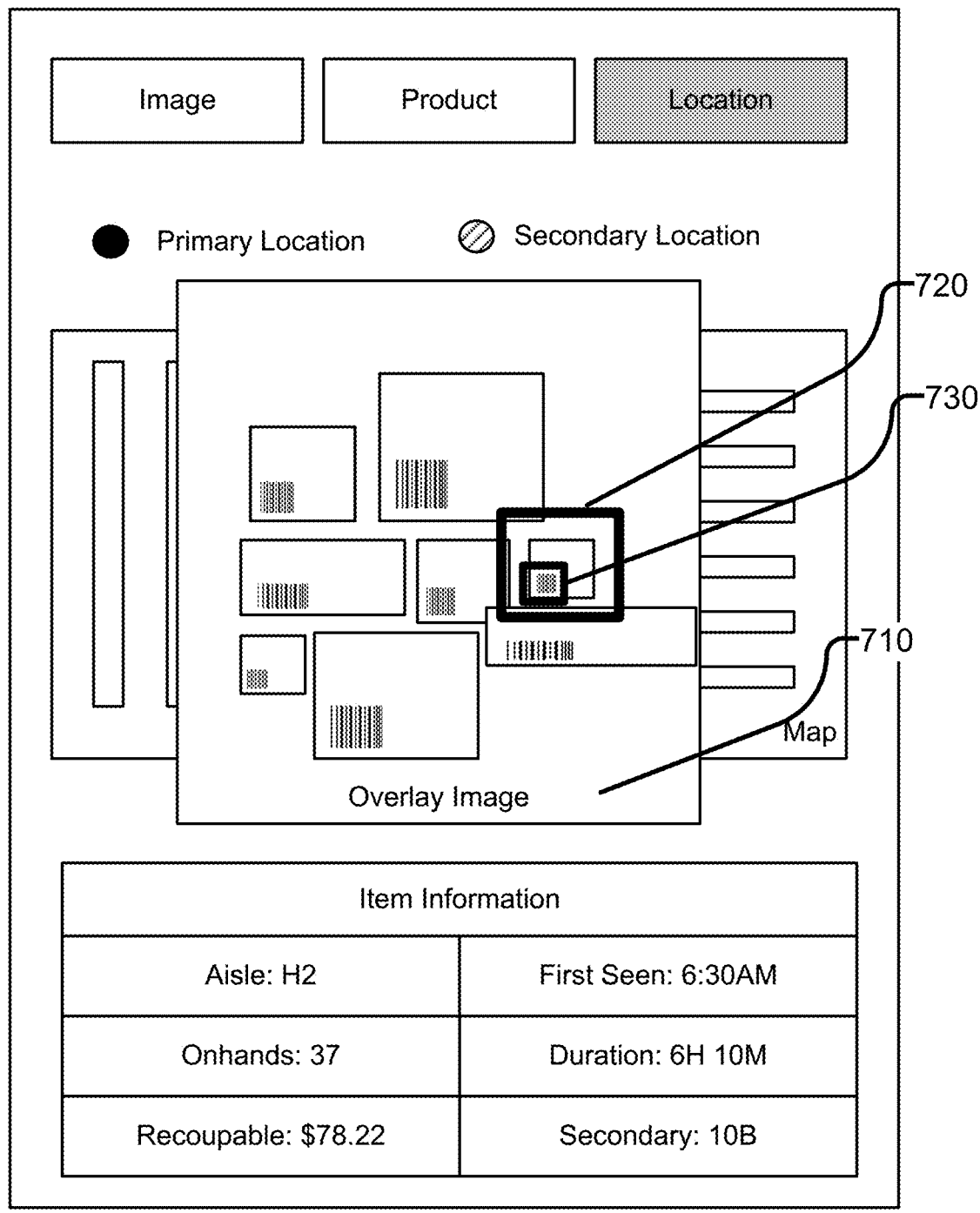
FIG. 7 illustrates another exemplary user interface for identifying a box of a product, in accordance with various embodiments.

FIG. 7 illustrates another exemplary user interface that a user could navigate to from the user interface illustrated in FIG. 6. In the user interface illustrated in FIG. 7, an image overlay 710 displays on top of the map 620. The image overlay 710 may be an image captured by a camera in the warehouse. The image may include a bounding polygon 720 that circles around the target product box and a second bounding polygon 730 that circles around the identifier associated with the target product box.

In one embodiment, the inventory visibility management system 160 provides a user interface described herein meaningfully improves user experience by providing various functionalities for validating operations and therefore reduce the likelihood of causing errors. For example, as products are stocked on the shelves and removed from the warehouse, the inventory visibility management system 160 functionally changes the user interface to provide different maps and functionalities. For example, a certain quantity of coffee K cups were stored at the front of the warehouse in a small quantity and stored on the $10^{th}$ shelf way in the back in a larger quantity. Existing system may at first direct the person to go to the front of the warehouse, but eventually when the small quantity runs out and then the person needs to be sent to the inconvenient location (i.e., $10^{th}$ shelf way in the back). However, the inventory visibility management system 160 may determine, when the new stock comes in, the product needs to be put in a more convenient location. In one embodiment, the inventory visibility management system 160 may learn such knowledge through the camera function and updates the map and directions of where to get the product.

Figure 8:
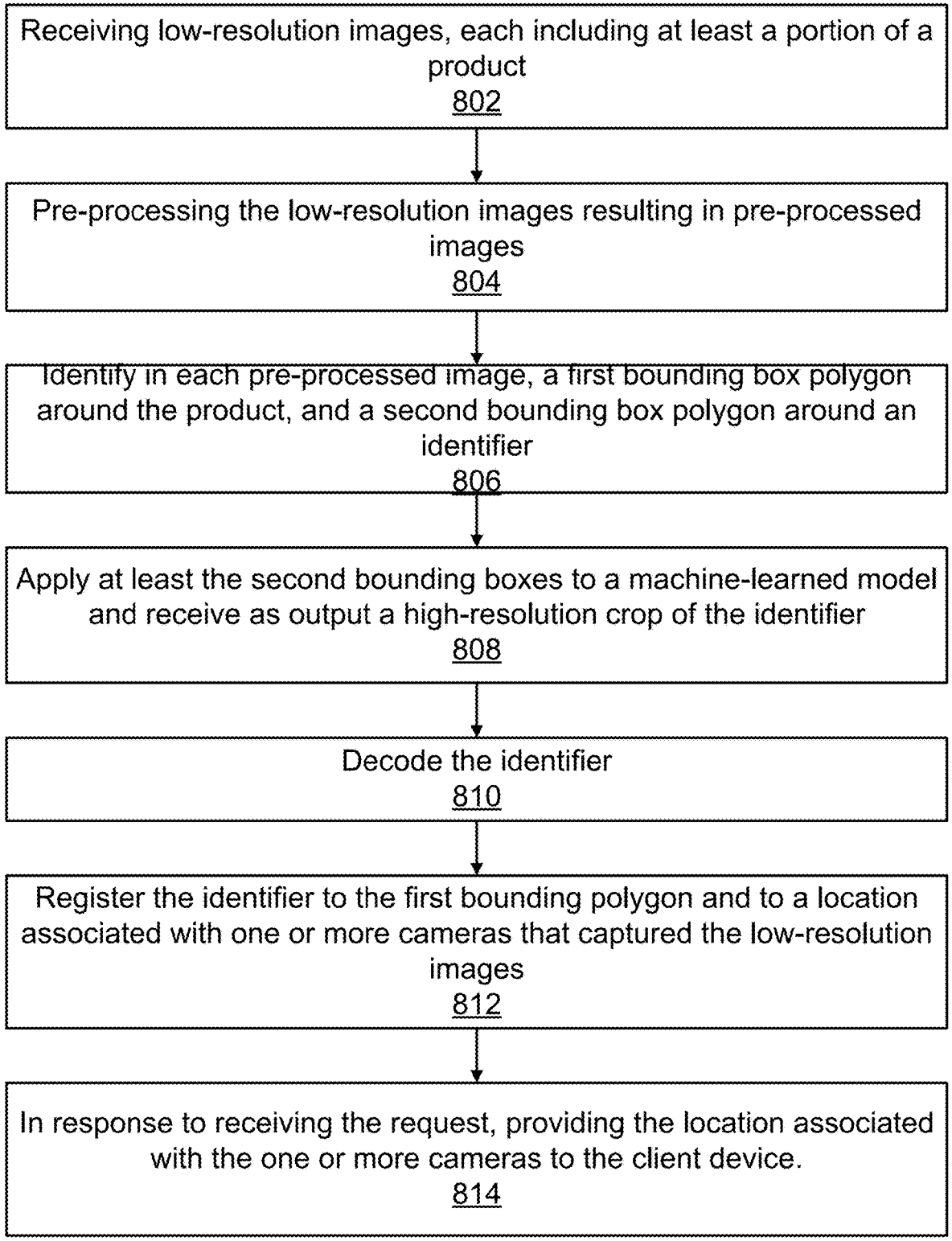
FIG. 8 illustrates an exemplary process for generating a higher resolution image based on multiple input images, in accordance with one embodiment.

FIG. 8 illustrates an exemplary process for managing inventories with the inventory visibility management system 160. The process starts with the image collection module 165 receiving 802 low-resolution images, each image including at least a portion of a product. The image collection module 165 may pre-process 804 the low-resolution images, resulting in a plurality of pre-processed images. The bounding polygon detection module 170 may identify 806 in each pre-processed image, a first bounding box polygon around the product, and a second bounding box polygon around an identifier associated with the product. The bounding polygon detection module 170 may apply 808 at least the second bounding boxes to a machine-learned model and receive as output a high-resolution crop of the identifier. The barcode reading module 190 may decode 810 the identifier. The image merging module 175 may register 812 the identifier to the first bounding polygon to a location associated with one or more cameras that captured the low-resolution images. In response to receiving a request for the product, the inventory visibility management system 160 may provide 814 the location associated with the one or more cameras to the client device through a user interface.

FIG. 9 illustrates an exemplary process for managing inventories using the inventory visibility management system 160. The process illustrated in FIG. 9 starts with the inventory visibility management system 160 receiving 902 an electronic indication that a product designated for a given shelf space of a first space is low in stock, the indication including an identifier associated with the product. The inventory visibility management system 160 may determine 904 a location of a replacement for the product in a second space (e.g., a warehouse or backroom) different from the first space based on a first image of the identifier being captured in the second space. The user interface module 180 may then display 906 the location of the box in the second space. The inventory visibility management system 160 may then validate 908 a placement of the replacement on the given shelf space, wherein the validating includes capturing 910 a second image of the location in the second space and determining from the second image that the replacement has been removed from the location.

Exemplary Use Cases

Striding Cameras

In one embodiment, striding cameras that walk along a specified route leveraging a motor and a track or zipline may be used for taking a sequence of images of barcodes and decode the barcodes based on multiple images. The striding cameras may walk and stops after a predetermined distance (e.g., stops every 4 feet or some limit switch). The striding camera may then stop and decode all possible barcodes based on captured images panning, tilting, and zooming to specific areas of interest and capturing images, detecting barcodes or QR codes or some other identifiers, and decoding those identifiers. The striding cameras may have various embodiments which are discussed below.

In one embodiment, the camera is installed with battery and motor, which may be referred to as trolley method. The battery may be big in size for this case, as the battery may run out fast because of big torque for navigating bearing the battery.

In another embodiment, the camera is powered by a power source through a cable with motor on one side, which may be referred to as the ski lift method. Ski lift method might require long cable, which may cause issues because of tangled cable.

In another embodiment, the camera may use a brush motor on the side and the power is provided inside the cable. A separate system may be used to turn camera on/off.

In yet another embodiment, the cameras may be powered by wireless charging. After the cameras return home, they only charge their LiPo backup such that the cameras only need enough power to go back and forth. The motor may be installed on the camera or on the side for this embodiment.

Restocking System with Validation

The systems and methods described herein enable a store stocker to seamlessly restock an item that is out-of-stock without risk of stocking a wrong item (e.g., where there are many similar items in a facility) or being unable to locate the item. In an embodiment, the inventory visibility management system 160 may determine that a product in a store is out of stock or low on a customer-facing shelf. The inventory visibility management system 160 may determine whether the product exists in the facility, based on an up-to-date inventory tracker that is kept up to date. Where the system determines that the product does not exist in the facility, the system may automatically flag the product for replacement. Where the product does exist in the facility, the inventory visibility management system 160 may add the product to a queue for a worker or robot in a store to re-stock. Where the location of the product is known, the location is flagged for the worker or robot to re-stock. The inventory visibility management system 160 communicates with a client device of a worker (or directly communicates information to a robot) and provides the worker with a map interface for the user to navigate to the location of the product. The inventory visibility management system 160 updates inventory based on user input and verifies that the user actually picked up the product from future images.

The inventory visibility management system 160 may include a restock detection system that may include cameras on the sales floor detects that a product is out of stock or low on the shelf on the sales floor and needs restocking. The inventory visibility management system 160 may receive the ping either locally or remotely, then checks the inventory via the user interface or database lookup to see if the product has backstock. If not, the system may place the product on a list for reordering on a local or remote database. If so, the inventory visibility management system 160 may insert the product to a prioritized list of tasks for the workers in the store to work on a local or remote database. The prioritized list may prioritize products to be restocked based on a level of need for restocking. For example, the list may be prioritized based on popularity of the product, how long the product has been out of stock, whether substitutes are in stock in the store, etc. The system may look up in a local or remote database that tasks product identifier to see if it has been detected on a box somewhere in the facility recently (within a period of time). If so, the system may add the information to the task in a local or remote database, which may include the locations of where the product identifier was last detected, the timestamp when it was last detected, and the box polygon overlaid onto an image from where the box polygon was detected from. If not, the system may add the product identifier onto a research list on a local or remote database for further inquiry by management. Users may request the next pick or batch of picks to restock to go retrieve by going to the user interface which displays the picks in prioritized order. For each pick, a box identifier corresponds to the pick which the system attempts to retrieve by looking in a remote or local database for the last decoded box polygon and location ID with the box identifier. If successfully retrieved, the interface will show the location of the picks on a map, with the pick identifiers for the user to navigate to the location. On subsequent image captures from the cameras in storage and the cameras on the sales floor, the system may detect if the task has been successfully completed by seeing if the box was removed from storage and if the product was indeed restocked on the sales floor.

New Inventory Management

In one embodiment, the system may determine based on images captured on the sales floor, that newly unloaded products are not going to fit in the sales floor. The inventory visibility management system 160 may directly divert the new products to backroom given such knowledge. In one embodiment, responsive to detecting that a batch of new inventory is in the warehouse (e.g., new inventory is scheduled to be delivered and a person made a record that new inventory came in, etc.), the inventory visibility management system 160 may reference the planogram (which was populated based on the images) and determine what products can or cannot fit on shelves, and a quantity of the products (e.g., four cases of Coke need to be sent to the sales floor and, the other 12 cases need to be sent to the back).

In another embodiment, the inventory visibility management system 160 may determine that the new inventory is going to be moved directly from truck to sales floor. In one embodiment, the inventory visibility management system 160 may ping new images directly rather than reference planogram responsive to detecting as described in the previous embodiment.

In one embodiment, for the products directed to the backroom, the inventory visibility management system 160 may determine if there already exits a number of the products in the backroom. Responsive to determining that a number of the products is already stored in a location in the backroom, the inventory visibility management system 160 may direct the delivery people using the user interface to the location so that all the products are organized in one place. The inventory visibility management system 160 may update the database with location of the new inventory (e.g., using super res algorithm), so that when people need to retrieve the product, the UI may retrieve the information from the database and navigate the people to the location.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for benchmarking, grouping, and recommending CSP shapes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving a plurality of low-resolution images captured by one or more low-resolution cameras in a warehouse, each of the images including at least a portion of a singular product box, the plurality of low-resolution images having a resolution lower than a predetermined threshold, wherein the singular product box includes a plurality of units of a particular product for restocking the particular product from the warehouse onto a customer-facing product shelf;
   pre-processing the low-resolution images resulting in a plurality of pre-processed images;
   identifying, in each respective one of the plurality of pre-processed images, a first bounding polygon that surrounds the singular product box, and a second bounding polygon that surrounds an identifier labeled on the singular product box, wherein the second bounding polygon is surrounded by the first bounding polygon;
   applying at least the second bounding polygons from each of the pre-processed images to a machine-learned model and receiving as output from the machine-learned model a high-resolution crop of the identifier, wherein the high-resolution crop is generated by the machine-learned model using at least a first one and a second one of the pre-processed low-resolution images, the first and second images having an overlapping field of view that includes at least the portion of the singular product box, the first and second image being captured within a threshold distance or a threshold time of each other;
   decoding the identifier;
   registering the identifier to the first bounding polygon and to a location in the warehouse that is associated with the one or more low-resolution cameras that captured the plurality of low-resolution images;
   receiving a request from a client device to locate in the warehouse, the particular product associated with the identifier; and
   in response to receiving the request, providing the location in the warehouse associated with the one or more low-resolution cameras to the client device.

2. The method of claim 1, wherein the pre-processing further comprises removing pixels corresponding to humans from the low-resolution images prior to applying to the machine-learned model.

3. The method of claim 1, wherein the pre-processing further comprises removing occlusions blocking the product from the low-resolution images prior to applying to the machine-learned model.

4. The method of claim 1, wherein a merge algorithm is used to merge the plurality of low-resolution images into a single high-resolution image, the merge algorithm producing homography estimation for each pair of low-resolution images, wherein the high-resolution image has a resolution higher than the plurality of low-resolution images.

5. The method of claim 4, wherein the merge algorithm is applied using a CNN (convolutional neural network) or Sobel Algorithm with a classifier for each low-resolution image.

6. The method of claim 1, wherein registering the identifier comprises:
extracting features from an image pair comprising a first image and a second image, the first image having an overlapping FOV (field of view) with the second image;
calculating a homography and determining a quality of the homography; and
registering the second image to the first image.

7. The method of claim 1, further comprising:
responsive to delivery of a batch of the product, determining whether the batch of the product fits in a first location; and
responsive to determining that the batch of the product does not fit in the first location, transmitting an alert to a person to divert the batch of the product to a second location for storage.

8. The method of claim 1, wherein each of the one or more low-resolution cameras is a striding camera that takes a stop each time the camera finishes traveling a predetermined distance, wherein the camera takes an image at each stop.

9. The method of claim 8, wherein the striding cameras are powered by cable or wireless charging.

10. A non-transitory computer-readable storage medium comprising memory with executable computer instructions encoded thereon that, when executed by one or more processors, cause the one or more processors to perform operations, the instructions comprising instructions to:
receive a plurality of low-resolution images captured using one or more low-resolution cameras in a warehouse, each of the images including at least a portion of a singular product box, the plurality of low-resolution images having a resolution lower than a predetermined threshold, wherein the singular product box includes a plurality of units of a particular product for restocking the particular product from the warehouse onto a customer-facing product shelf;
pre-process the low-resolution images resulting in a plurality of pre-processed images;
identify, in each respective one of the plurality of pre-processed images, a first bounding polygon that surrounds the singular product box, and a second bounding polygon that surrounds an identifier labeled on the singular product box, wherein the second bounding polygon is surrounded by the first bounding polygon;
apply at least the second bounding polygons from each of the pre-processed images to a machine-learned model and receive as output from the machine-learned model a high-resolution crop of the identifier, wherein the high-resolution crop is generated by the machine-learned model using at least a first one and a second one of the pre-processed low-resolution images, the first and second images having an overlapping field of view that includes at least the portion of the singular product box, the first and second image being captured within a threshold distance or a threshold time of each other;
decode the identifier;
register the identifier to the first bounding polygon and to a location in the warehouse that is associated with the one or more low-resolution cameras that captured the plurality of low-resolution images;
receive a request from a client device to locate in the warehouse, the particular product associated with the identifier; and
provide the location in the warehouse associated with the one or more low-resolution cameras to the client device upon receipt of the request.

11. The non-transitory computer-readable storage medium of claim 10, wherein the instructions to pre-process further comprises instructions that when executed cause the one or more processors to remove pixels corresponding to humans from the low-resolution images prior to applying to the machine-learned model.

12. The non-transitory computer-readable storage medium of claim 10, wherein the instructions to pre-process further comprises instructions that when executed cause the one or more processors to remove occlusions blocking the product from the low-resolution images prior to applying to the machine-learned model.

13. The non-transitory computer-readable storage medium of claim 10, wherein a merge algorithm is used to merge the plurality of low-resolution images into a single high-resolution image, the merge algorithm producing homography estimation for each pair of low-resolution images, wherein the high-resolution image has a resolution higher than the plurality of low-resolution images.

14. The non-transitory computer-readable storage medium of claim 13, wherein the merge algorithm is applied using a CNN (convolutional neural network) or Sobel Algorithm with a classifier for each low-resolution image.

15. The non-transitory computer-readable storage medium of claim 10, wherein the instruction to register the identifier further comprises instructions that when executed cause the one or more processors to:
extract features from an image pair comprising a first image and a second image, the first image having an overlapping FOV (field of view) with the second image;
calculate a homography and determining a quality of the homography; and
register the second image to the first image.

16. The non-transitory computer-readable storage medium of claim 10, wherein the memory further comprises instructions that when executed cause the one or more processors to:
determine whether a batch of the product fits in a first location upon delivery of the batch of the product; and
transmit an alert to a person to divert the batch of the product to a second location for storage upon determining that the batch of the product does not fit in the first location.

17. The non-transitory computer-readable storage medium of claim 10, wherein each of the one or more low-resolution cameras is a striding camera that takes a stop each time the camera finishes traveling a predetermined distance, wherein the camera takes an image at each stop.

18. The non-transitory computer-readable storage medium of claim 17, wherein the striding cameras are powered by cable or wireless charging.

19. A computing system comprising:
a processor; and
a non-transitory computer-readable storage medium storing instructions for managing inventory visibility, the instructions when executed by the processor cause the processor to perform steps including:

receiving a plurality of low-resolution images captured using one or more low-resolution cameras in a warehouse, each of the images including at least a portion of a singular product box, the plurality of low-resolution images having a resolution lower than a predetermined threshold, wherein the singular product box includes a plurality of units of a particular product for restocking the particular product from the warehouse onto a customer-facing product shelf;

pre-processing the low-resolution images resulting in a plurality of pre-processed images;

identifying, in each respective one of the plurality of pre-processed images, a first bounding polygon that surrounds the singular product box, and a second bounding polygon that surrounds an identifier labeled on the singular product box, wherein the second bounding polygon is surrounded by the first bounding polygon;

applying at least the second bounding polygons from each of the pre-processed images to a machine-learned model and receiving as output from the machine-learned model a high-resolution crop of the identifier, wherein the high-resolution crop is generated by the machine-learned model using at least a first one and a second one of the pre-processed low-resolution images, the first and second images having an overlapping field of view that includes at least the portion of the singular product box, the first and second image being captured within a threshold distance or a threshold time of each other;

decoding the identifier;

registering the identifier to the first bounding polygon and to a location in the warehouse that is associated with the one or more low-resolution cameras that captured the plurality of low-resolution images;

receiving a request from a client device to locate in the warehouse, the particular product associated with the identifier; and in response to receiving the request, providing the location in the warehouse associated with the one or more low-resolution cameras to the client device.

20. The computing system of claim 19, wherein the pre-processing further comprises removing pixels corresponding to humans from the low-resolution images prior to applying to the machine-learned model.

\* \* \* \* \*